United States Patent Office 3,714,039
Patented Jan. 30, 1973

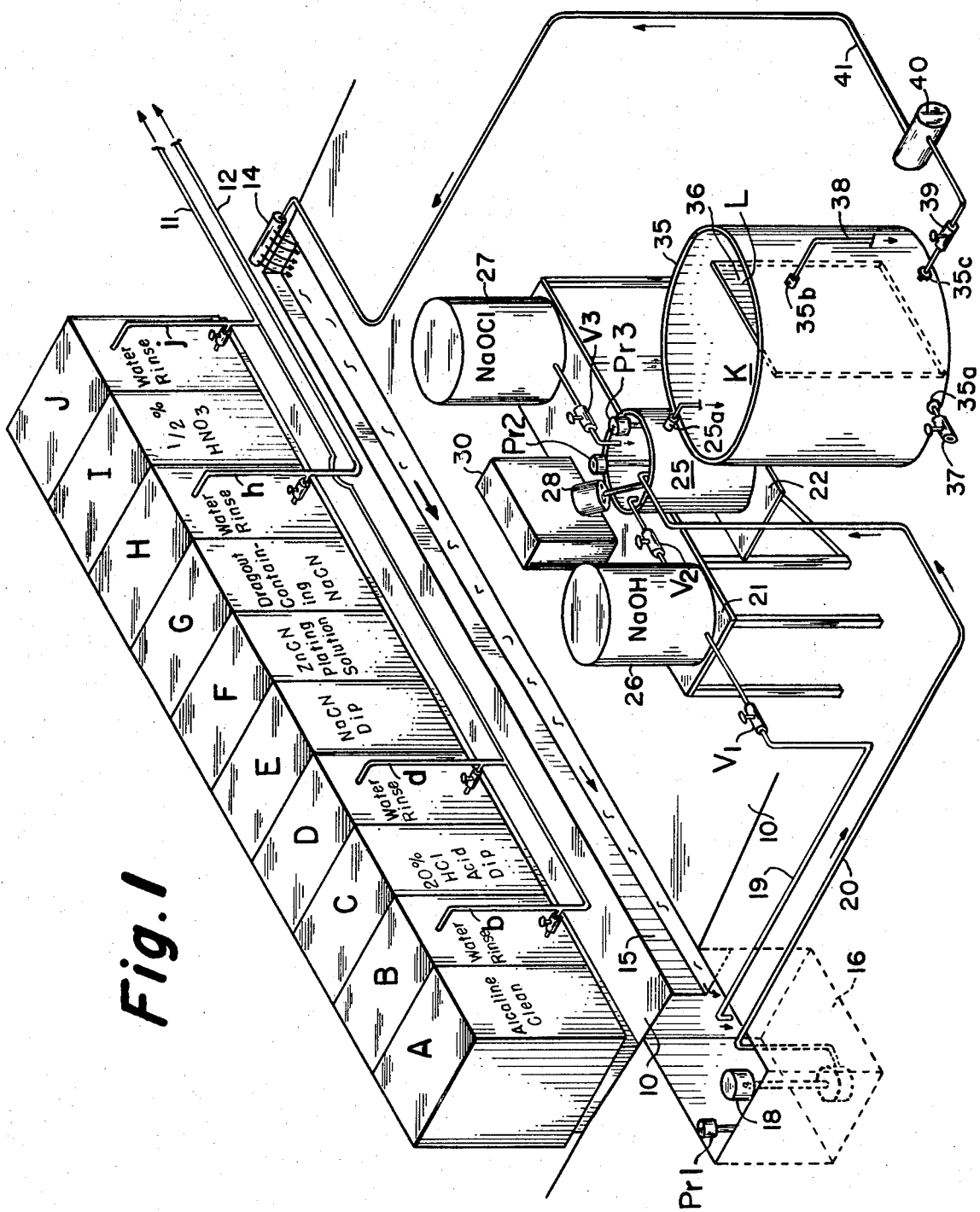

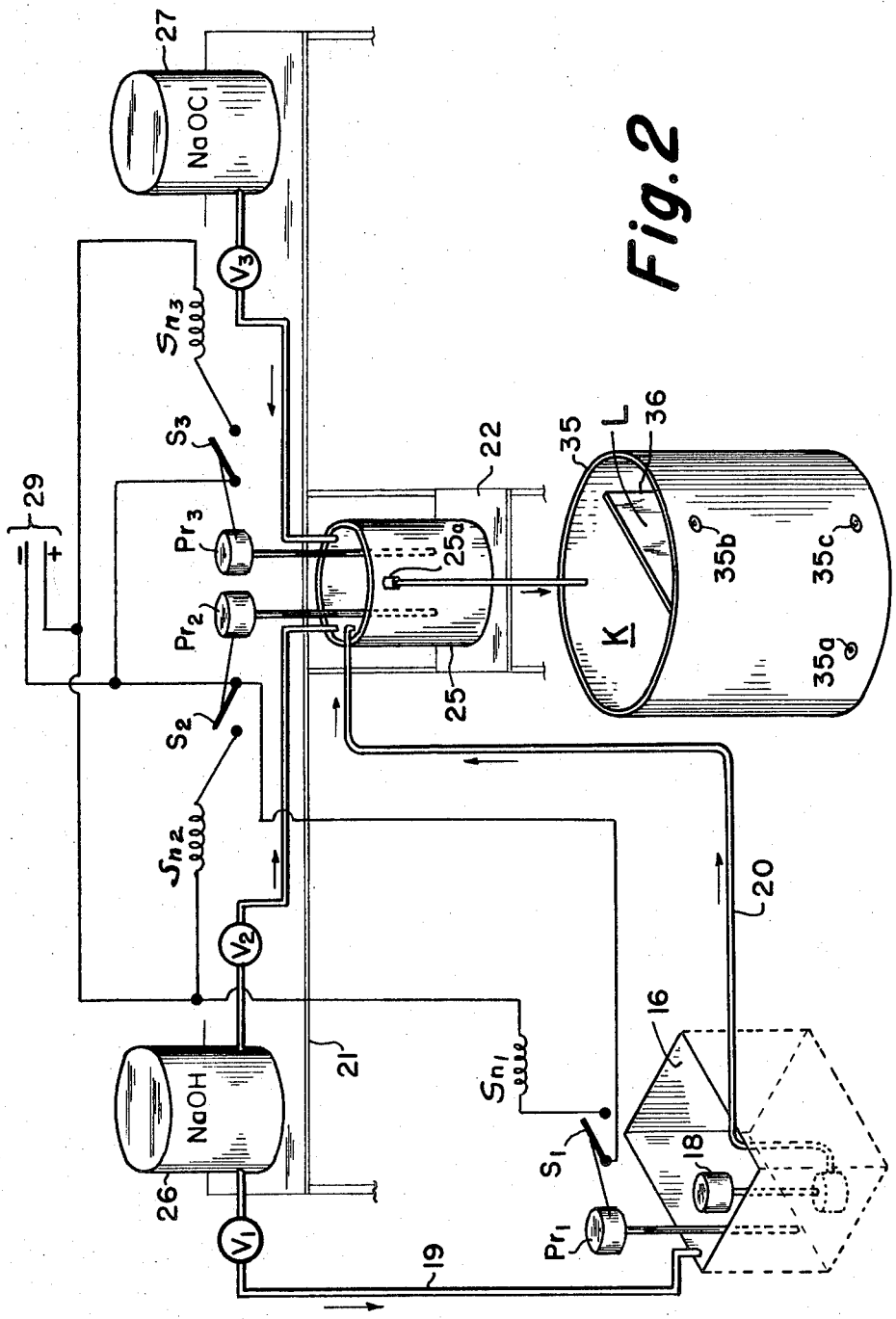

3,714,039
TREATMENT OF WASTE METAL PROCESSING SOLUTION SPILLAGE
Leslie E. Lancy, Ellwood City, and Ivan E. Wittmann, Wexford, Pa., assignors to Dart Industries Inc., Los Angeles, Calif.
Filed Apr. 13, 1971, Ser. No. 133,520
Int. Cl. C02b 11/36; C02c 5/02
U.S. Cl. 210—60
18 Claims

ABSTRACT OF THE DISCLOSURE

A process for treating spillage and waste solutions from a line of metal finishing processing solution tanks to prevent the forming of toxic hydrogen cyanide gas is provided and continuously utilized by flowing a waste solution receiving and conditioning liquid along a floor catch basin. The conditioning liquid with its liquid waste content from a lower end of the catch basin is collected in an end-positioned sump having sufficient capacity to allow safe treatment of the probable worst condition with regard to the spillage of acid and cyanide solution containing tanks of the processing line. A pH indicator is provided at the sump for immediately indicating the approach of the solution to or the attainment of an acid pH due, for example, to a major spillage or a complete loss of solution from an acid containing tank of the line. This indicator is connected to cause the opening of a normally closed valve for immediately supplying a neutralizing alkaline chemical, such as sodium hydroxide, to the solution in the sump and bring it up to and maintain it within an alkaline pH range to inhibit the formation of toxic hydrogen cyanide gas. The solution from the sump is continuously flowed into a conditioning tank, at which time, a soluble alkaline chemical, such as an earth metal hydroxide, is added to raise its pH, and a cyanide reacting chemical, such as sodium or calcium hypochlorite or chlorine, may be added to react with any cyanide content to destroy cyanide chemicals through oxidation by chlorine in the alkaline range. The solution is moved from the conditioning tank into a reservoir where it is held to precipitate-out and settle the precipitated metal salts and provide a fully reconditioned aqueous liquid or solution for reutilization.

BACKGROUND OF THE INVENTION

Field of the invention

This invention relates to the treating of liquid floor spillage from a metal solution processing line to avoid the formation of toxic gas in the plant. It particularly applies to the employment of a flowing conditioning aqueous liquid or solution for continuously collecting spillage and waste solutions on a floor level and conditioning such solutions to assure that no toxic gas is generated. A phase of the invention deals with so conditioning liquid or solution waste or spillage from treatment tanks as to avoid an adverse reaction between any acid content thereof and any cyanide content thereof to form toxic hydrogen cyanide gas.

Description of the prior art

A metal finishing installation usually contains a number or line of processing solution tanks to provide for cleaning, descaling and processing, such as electrolytic deposition, and for the application of metal coatings and of conversion coatings of various kinds. Between each processing bath, solution or tank, there is usually a water rinse bath or tank to allow the work in process to be rinsed free of a previous processing solution before entering the next treating bath, solution or tank. Such processing solutions, whether they are cleaners, descalers, electroplaters, etc., contain various chemical compounds, such as alkali materials, inorganic acids such as hydrochloric, sulfuric, chromic acids, etc., cyanide chemicals such as sodium cyanide, potassium cyanide, zinc cyanide, etc., and less frequently, organic acids such as acetic, citric, gluconic, etc. A treating line may also contain organic type processing solutions, such as soluble oil or solvent phenolic type paint strippers, etc. To accomplish proper waste treatment of effluent coming from a metal finishing operation, usually the rinse waters and the various process solutions when discarded are segregated in such a manner that proper treatment can be provided for the various constituents, depending on the chemistry or biological treatment that is necessary. When designing a waste treatment installation for a metal finishing plant that contains various processing solutions, such as above indicated, the segregation of the rinse waters can be accomplished by piping in a suitable manner. It is also possible to dispose of periodic batch dumps in a segregated manner using, for example, a portable pump, and when a particular process solution is to be dumped, directing the discharge from the portable pump to a holding tank that serves as a means of segregation, to thereby keep each of the various process solutions separate according to its nature and the desired treatment that is to follow.

On the other hand, when one is confronted with a need for segregating various wastes that may come from floor spillage, accidental overflow of various processing solutions, drippage from work being transferred from tank to tank, breaking of a filter hose, heat exchanger leakage, etc., the factors involved are entirely different. A potential hazard from the standpoint of a high concentration of toxic material in the effluent is far greater with accidental discharges than with routine treatment needs of rinse water and treatment possibilities with periodic dumps. Since rinse water carries only the thin film of solution dragged-out on the workpieces and entering a rinse tank, the quantity thus indirectly removed from a processing solution, even in a very large installation, may not amount to more than 10 gal./hr. That is, the rinse water content of a processing chemical is diluted by the copious flow of water usually employed. On the other hand, the toxic potential by reason of losing, for example, the solution from a 10,000 gallon plating bath containing 1 lb./gal. of cyanide is so great that whenever such an accident occurs, an entire river basin may be jeopardized.

Some of the state regulation agencies, recognizing such a potential hazard, now require a holding pit under each highly toxic processing solution tank or bath. An installation of this nature is very expensive and although it may be accomplished in a new plant, is beyond the financial ability of most organizations that have plating plants that were installed some years ago and that usually operate over a floor containing drainage ditches or pits to which all the rinse waters flow to thus wash the floor and carry floor drippage and spillage of the chemical solutions with the rinse water. When rinse waters are carried in a closed circuit and an attempt is made to collect floor spillage, the problem arises of avoiding a mixing of waste solutions containing cyanide compounds and those that are acidic in nature. In an old installation attempting to contour the floor to provide proper drainage ditches, segregated sumps, curbs between areas where cyanide type and acid type process solutions are used is very expensive and practically impossible to accomplish. Even in new installations, problems have arisen in endeavoring to provide segregated pickup of leakage from pipe lines to filtration areas, between the tanks and pumps, as well as to and from heat exchangers, etc.

In the past, hazards of the above type were at least ameliorated by copiously flowing the rinse waters over the floor area and continuously washing it to thus prevent accumulation of cyanide chemicals and acid waste.

In such a situation where these two chemicals mixed, the hope was that the concentration would be low enough that the faint odor of poisonous hydrocyanide gas would be noticed before the health of plant personnel would be seriously impaired. Also, allowing all rinse waters to be discharged on a plant floor in an unsegregated manner, raises the hazard of forming of even higher concentrations of this poisonous gas from spillage or leakage of the actual cyanide and acid solutions. This does not constitute an acceptable type of waste treatment. The problem is further complicated by the fact that there has been no positive way of determining when or where a particular spillage or leakage will arise, so that it may be segregated from other spillage and carried away without mingling and chemically reacting to form a toxic product such as hydrogen cyanide gas.

SUMMARY OF THE INVENTION

It has thus been an object of the invention to develop a new system or procedure for inexpensively and in a safe and practical manner handling spillage or liquid waste that is normally deposited on the floor of a plant having a chemical finishing installation for metal workpieces.

Another object of the invention has been to devise a practical, economical and effective solution to the problem above-outlined.

A further object of the invention has been to provide a continuous procedure for handling liquid wastes and spillage from metal processing baths or tanks, without presenting a health hazard to plant personnel.

A further object of the invention has been to provide a continuous flow of an aqueous liquid treating medium for collecting floor waste, spillage and the like, and for so conditioning it that toxic gases are inhibited from forming and and content may be handled for pre-discharge treatment without presenting a health hazard to plant personnel.

These and other objects of the invention will appear to those skilled in the art from the illustrated embodiment and the claims.

In accordance with the concept of the invention, as applied to the safe handling processing of liquid spillage or waste, a chemical-containing treatment liquid is employed as a flowing stream along a floor-positioned catch basin or collecting trough for receiving the liquid waste as it is produced. The waste is collected without regard to the nature of its processing tank or bath source and is treated within the collecting liquid, in such a manner as to basically prevent the formation of noxious cyanide gas by always maintaining an above neutral alkaline condition. As a further protection, the chemical treating or conditioning liquid may be provided with a chemical which will react with its cyanide content and break it down into harmless compounds.

The operation is accomplished continuously by reconditionnig the treatment solution or liquid, removing precipitates carried thereby and recirculating it back to and along the catch basin. Means is provided for indicating a near dangerous condition of the liquid by reason, for example, of an extra large spillage from a processing tank and for immediately supplying neutralizing or treating chemical to bring back the solution to a safe condition.

BRIEF DESCRIPTION OF THE DRAWINGS

In the drawings, FIG. 1 is a perspective or isometric view in elevation illustrating a typical arrangement of processing tanks or baths positioned along the floor of a metal processing plant and showing a system or operating arrangement embodying the invention.

And FIG. 2 is a somewhat schematic view particularly illustrating electric circuit and flow control means of a system or arrangement employing the invention.

DESCRIPTION OF THE PREFERRED EMBODIMENT

In accordance with the invention, a chemically adjusted aqueous solution or liquid is flowed in such a manner along a metal processing line as to serve as a collecting medium for liquid waste and spillage from any and all units of the line. Referring particularly to FIG. 1, a series of metal finishing baths or tanks represented as A through J is shown mounted in line on a plant floor 10 and as provided with a common line or conduit 11 for taking off waste water from representative water rinse baths or tanks B, D and J which are contaminated by alkaline and acid carryover from workpieces. On the other hnad, a separate line or conduit 12 is employed for the rinse water from tank H which has been contaminated by a cyanide compound such as sodium cyanide. Thus, the acid and alkaline contents may be used to neutralize each other, while the cyanide content may be treated in a segregated or separate manner to enable the discharge or reuse of its aqueous body. It is thus apparent that there is no particular problem involved in handling the cyanide solution content from the standpoint of controlled flow-off from tanks of a processing line. However, as previously pointed out, it is impossible to, in any satisfactory or practical manner, fully segregate cyanide solution waste spillage from, for example, acid containing waste spillage, since spillage is not controllable in the sense of a direct flow from any given tank or bath.

In FIG. 1, a catch basin, gutter, dike, flow trough or floor pathway 15 is shown extending longitudinally in a forwardly spaced and adjacent, in-line, aligned relation with respect to the tanks or baths A to J, inclusive, and as sloped from an upstream to a downstream end thereof to serve as a continuous flow channel for spillage or leakage waste liquids or solutions. The floor 10 of the plant is preferably slightly sloped downwardly forwardly from the tanks into the gutter or catch basin 15, in order to assure a prompt and full collection of the waste liquids or solutions as they may be spilled or otherwise deposited on the floor. Conditioning or treating liquid having a predetermined chemical content is supplied to the upstream end of the catch basin 15 from a supply heater 14 that may be a series of perforations therealong.

A single collecting sump or well 16 is shown positioned below the floor level at an end of the processing line and downstream of the catch basin 15 to receive the liquid as it is continuously flowed along in front of the processing tanks or baths. It will be noted that the sump 16 may have a size or capacity that is sufficient to accommodate an initial spill from an individual tank, such as from the acid dip tank or bath C or the cyanide containing tank G. The sump 16 is shown located beneath the floor level 10, in front of the processing line A to J, at the starting or upstream end thereof. Thus, one sump 16 serves as a collecting means for all of the waste liquids that are lost or spilled on the floor 10, and that are received within and advanced by the conditioning or treating liquid as continuously supplied by the header 14.

In FIG. 1, a pH probe $Pr_1$ is shown for giving an instantaneous indication or reading as to the pH of the liquid or solution within the sump 16. Also, if desired, a cyanide sensing instrument (not shown) may be provided to indicate a dangerous rise of cyanide content, such as might be occasioned by a leak or break in the bath or tank E or F. The pH probe serves as an instantaneous indicator of the change in the character of the liquid from a plus alkali to an approaching acid condition. A conventional sump pump 18 is shown positioned within the sump 16 for continuously supplying a return flow of solution or liquid along piping or line 20 into a conditioning tank or bath 25 of a conditioning, precipitating and holding assembly. The assembly which may have a somewhat remote location in the plant, is shown consisting of an alkali supplying tank or bath 26, a cyanide-reacting chemical containing tank or bath 27, and a control panel 30 mounted on an elevated table or platform 21. A supplemental table or platform 22 serves as a support for conditioning tank 25, and a holding and reservoir tank 35 is shown positioned on a lower level, such as on a lower floor of the plant.

A pH probe $Pr_2$ is shown positioned within the tank 25 to indicate when a desired alkalinity has been attained and an electric mixer 28 is shown extending into the tank for mixing reconditioning chemicals being introduced with the liquid to form a reconditioned solution therein. In this connection, tank 26 may contain a conventional alkali, such as earth metal hydroxide in the nature of sodium hydroxide, and tank 27 may contain a suitable chemical or chemical compound for breaking down a metal cyanide into other or innocuous compounds. A cyanide-sensitive electrode $Pr_3$ may be employed to indicate the amount of cyanide present in the solution of the tank 25 and to accordingly, introduce an appropriate quantity of sodium or calcium hypochlorite, chlorine gas, hydrogen peroxide or permanganate from the tank 27. The operation may be controlled manually by an operator standing on the platform 21, who notes the reading of the pH probe $Pr_2$ and adjusts the flow of chemical from the tanks 26 to provide the liquid or solution with a dissolved alkaline content such that its pH is above 8 and preferably within a range of about 10 to 12 before the reconditioned liquid is flowed, for example, through outlet 25a into a settling or precipitating-out chamber K of reservoir or holding tank 35. The operator may also add a chemical from the tank 27 that will be sufficient to at least react with any metal cyanide compound present in the solution of the tank 25 to form innocuous breakdown compounds before the solution is to be reused for return flow along the catch basin 15. In this connection, the electrode $Pr_3$ will give him indicating readings.

Liquid received within the chamber K will have a retention time of a minimum of about one half hour, depending on the total pump flow, and an optimum of about 1½ hour retention time. This will be assured by a suitable sizing of the tank or reservoir 35. The purified or reconditioned liquid flows over an upper lip edge of a partition 36 into a holding chamber L from which excess liquid may be removed through outlet 35b and piping 38 for discharge conditioning treatment. However, sufficient liquid is maintained within the chamber L to continuously supply a stream through bottom outlet 35c, valve 39 and line or piping 41 to the flow header 14. A suitable pump, such as a centrifugal pump 40, is shown in the line 41 for returning the liquid as conditioned or reconditioned for flow along the catch basin 15. Sludge may be removed periodically from the compartment K which has a valve 37 for controlling outflow from its bottom outlet 35a.

In FIG. 2, a representative automatic system is illustrated wherein the pH probe $Pr_1$ operates a switch $S_1$ to close it and thus energize solenoid $Sn_1$ when the pH of the liquid within the sump 16 is approaching a dangerous or acid condition. This may occur, when the pH drops for example under 8 and towards a neutral to acid pH. The energization of the solenoid $Sn_1$ is effected through electric lines from a suitable source 29 to open spring-closed control valve $V_1$ and immediately supply alkali chemical in solution form to the liquid within the sump 16 to thus bring it back to a proper or sufficient alkali content which, as an optimum, may be 10 to 12 pH and as a minimum above about 8. When the pH within the sump 16 reaches an acceptable value, then the probe $Pr_1$ opens the switch $S_1$ to thus de-energize the solenoid $Sn_1$, whereby the valve $V_1$ closes.

A similar arrangement may be utilized, if desired, for adding a cyanide reacting type of chemical directly to th sump 16. However, this has not been shown as it is a further refinement and normally the tank 27 will be utilized to supply such a chemical through control valve $V_3$ to the solution containing tank 25, primarily for reconditioning the liquid therein for reuse. In FIG. 2, valve $V_3$ controls the flow of chemical from the tank 27. This valve is spring-pressed towards a closed position and is opened when cyanide sensitive electrode $Pr_3$ closes switch $S_3$ to energize electric solenoid $Sn_3$. After the metal cyanide content of the liquid within the conditioning tank 25 has gone down, then the electrode $Pr_3$ will open the switch $S_3$ and thus cause the valve $V_3$ to close.

The probe $Pr_2$ is also shown positioned to extend within the tank or bath 25 for the purpose of operating a switch $S_2$ to energize solenoid $Sn_2$ and open flow control valve $V_2$ that is positioned in a line leading from the alkaline chemical containing tank 26 to the conditioning tank 25. The probe $Pr_2$ will open the switch $S_2$ when the pH is below a suitable setting of, for example, 10 or at least above 8, to thereby cause a flow of alkali chemical into the tank 25 and until the alkalinity has been increased sufficiently to cause an operation of the probe $Pr_2$ to open the switch $S_2$ and de-energize the solenoid $Sn_2$. Since the valve $V_2$ is spring-biased towards a closed position, it then closes.

Although not shown, electric solenoid control lines may lead to the control panel 30 and the panel may have manually operated switches in parallel across the switches $S_1$, $S_2$ and $S_3$ to supply electrical energy from the source 29 to the solenoids, for manually controlling the operations. However, the system illustrated in FIG. 2 is preferable as it is automatic in operation.

The chemical used in the tank 26 may be, for example, a suitable water soluble alkali and preferably an inexpensive one such as alkali earth metal hydroxide in the nature of sodium or potassium hdyroxides, while the reacting chemical provided in the tank 27 may be a suitable cyanide breakdown chemical, such as a sodium or calcium, hypochlorite, chlorine gas, hydrogen peroxide or permanganate. The chemical of tank 27 will be of a type to eliminate or at least break-down metal cyanides at least to such an extent that hydrogen cyanide gas cannot be formed. As previously indicated, the amount of chemical supplied by the tank 27 will be in an amount sufficient to break-down cyanide compounds in the carry-over from the sump 16, but, if desired, may be added in an additional or excessive quantity sufficient to react with a normal quantity of cyanides received by the liquid flowing along the basin 15. This minimizes the conditioning burden if, for example, a massive cyanide spill should occur. The chemical from the tank 27 thus provides a further assurance from the standpoint of rendering the liquid waste fully innocuous, particularly to operating personnel. It will also make the liquid or solution collected in the sump 16 innocuous from the standpoint of avoiding a sudden overwhelming contamination of a stream or natural body of water, in the event of one or two of the tanks of the representative line A to J should fail and dump or spill its contents.

In accordance with the invention, the treatment solution or liquid is recirculated and continuously monitored for pH change and is provided with a chemical feed to bring its alkalinity back to a minimum required preset range. The probe $Pr_1$ may, instead of operating a switch, be connected to operate an alarm bell to alert an operator on the platform 21. One alarm may also be used for indicating a fall-off of pH and another may be used for indicating a fall-off of cyanide reacting chemical or a dangerous percentage build-up of cyanide within the liquid or solution.

Any commercially available sensor, indicator or alarm type of devices may be used in the disclosed system. For example, as may be desirable, such a device may be used to determine the quantity or height of liquid within or flow rate into, for example, the sump 16. Such a device will enable an operator to effect compensating manual operations or, through the agency of an electrical system, automatically operate a solenoid-controlled valve takeoff, for example, directly from line 20 to supplement overflow through outlet 35b and permit the removal of excess liquid in the event of a major spillage. For normal operation of the system, the location of the outlet 35b of FIG. 1 from the standpoint of the height of the overflow chamber L, will be such as to provide an overflow when the liquid or solution available for recirculation tends to rise above a desired quantity. Liquid or solution taken-off through the piping 38 may be cycled into a conditioning tank if its content is of a nature requiring, for example, full neutralization or further treatment before discharge into a sewer line. A bypass, however, may be provided to flow the liquid or solution directly to the sewer where its condition, as checked in the overflow chamber L of the reservoir 35, is suitable for direct discharge. For example, this type of flow may be employed when an electrode type of probe indicates that there is no contaminating cyanide or chromate in the solution. Also, depending upon the content of the solution bled the chamber L, it may be combined with a waste solution being removed from, for example, a chromic acid treating tank, in order to consolidate the conditioning of the liquid with a like liquid that is being taken off from a given solution treating bath of the process line.

The rate of flow of the conditioning solution for recirculating movement, starting with the return line 41, can also be controlled, for example, by varying the speed of motor drive of the pump 40 to compensate for a greater rate of spillage of waste liquid that may occur during a particular period of operation. The reservoir 35, and particularly the settling chamber K thereof, should be of sufficient size to allow substantially full settling of precipitated solids therein and a retention of the recirculated liquid for a period, such as previously indicated. The system will be set to operate under normal conditions and to immediately give an alarm or to sense and to enable or effect a necessary compensating action in the event of an above normal spillage, all to the end of inhibiting the formation of poisonous hydrogen cyanide gas and of continuously and effectively handling spillage under normal as well as emergency high volume conditions of leakage, wastage or spillage of treatment chemical liquids.

We claim:

1. In a safe handling processing of liquid spillage or waste incident to the use of a line of processing solution-containing tanks positioned on a plant floor to prevent the forming of toxic cyanide gas by chemical reaction of acid waste liquid from an acid solution-containing tank and a separate cyanide solution-containing tank of the line, providing a longitudinally extending catch basin along the floor in alignment with the line of processing tanks, providing a sump at one end of the floor, sloping the catch basin towards the sump to collect and flow waste solution lost from the tanks into the sump, introducing and flowing a chemical containing treatment liquid along the catch basin for collecting waste solution from the tanks, and substantially immediately on the introduction of the chemical content of the waste solution chemically reacting it with the chemical content of the treatment liquid in such a manner as to inhibit the forming of hydorgen cyanide gas from the waste solution collected within the catch basin.

2. In a processing as defined in claim 1, supplying the treatment liquid to the catch basin at a pH within a range of above about 8 to neutralize any acid content of the waste solution.

3. In a processing as defined in claim 1, checking the pH of the solution within the sump to assure its alkaline condition and, when it is indicated that the solution is approaching or has reached an acid condition, immediately introducing an alkaline chemical into the solution within the sump until a higher pH is attained therein.

4. In a processing as defined in claim 3, introducing the alkaline chemical until the solution within the sump has attained a pH of above about 8.

5. In a processing as defined in claim 3, flowing the solution from the sump into a conditioning tank and from thence into a reservoir, holding the solution within the reservoir and collecting precipitates therefrom, and thereafter removing the solution from the reservoir and flowing it in an alkaline condition as a treatment liquid along the catch basin.

6. In a processing defined in claim 5, dissolving an alkaline chemical in the solution within the conditioning tank to bring the solution up into and beyond a minimum alkaline pH content before flowing the solution along the catch basin.

7. In a processing as defined in claim 6, adding a chemical to the solution in the conditioning tank that will react with any cyanide content of the waste liquid and prevent the formation of toxic hydrogen cyanide gas in the presence of an acid pH.

8. In a processing as defined in claim 5, providing a precipitate collecting chamber and a liquid holding chamber in the reservoir, first moving the solution from the conditioning tank into the collecting chamber and holding it therein while settling-out precipitated solids therefrom, then moving the solution by overflow into the holding chamber, and continuously pumping the solution from the holding chamber into one end of the catch basin and flowing it therealong into the sump.

9. In a processing as defined in claim 8, providing the solution that is being pumped into the catch basin with a pH of about 10 to 12.

10. In a processing as defined in claim 9, continuously checking the pH of the solution in the sump, and immediately supplying an alkaline chemical thereto to bring the pH up to at least above about 8 when the pH of the solution is indicated as approaching a neutral to an acid pH.

11. In a process as defined in claim 10, continuously checking the cyanide content of the solution in the conditioning tank, and adding a chemical to the solution that will react with and make any cyanide content of the solution fully innocuous from the standpoint of the introduction of an acid type of waste liquid.

12. In a process as defined in claim 10, taking-off any surplus solution from the reservoir and thereafter discharging it into a sewer.

13. In a processing as defined in claim 5, adding a chemical to the solution in the conditioning tank that will react with any cyanide content of the waste liquid and prevent the formation of hydrogen cyanide gas.

14. In a method for safe pick-up and processing of liquid waste or spillage that is incident to metal finishing operations without the forming toxic cyanide gas, wherein liquid-containing processing tanks that include separate acid and cyanide solution -containing tanks are used along a plant floor in the finishing operations, the steps of flowing an aqueous alkaline chemical treating solution as a liquid stream adjacent the tanks along the plant floor, introducing liquid waste from the tanks that is normally deposited on the plant floor into and collecting it in the flowing liquid stream, immediately diluting and reacting any acid pH waste liquid content then in the flowing stream with the alkaline chemical content thereof for attaining an above neutral to an alkaline pH and inhibiting the formation of toxic cyanide gas, flowing the waste-containing liquid stream into a conditioning tank; based on the pH of the liquid flowing into the conditioning tank, supplying a quantity of alkaline chemical thereto to bring its pH substantially above the acid pH range; thoroughly mixing the alkaline chemical with the liquid in the conditioning tank, thereafter flowing the conditioned liquid into a reservoir and collecting precipitated chemicals therein; finally flowing the conditioned liquid from the reservoir in a return path as a stream along the floor, and again introducing and collecting liquid waste from the tanks therein and repeating the defined operations.

15. In a method as defined in claim 14, introducing a chemical into the liquid within the conditioning tank that will chemically react with any dissolved waste cyanide content thereof and form innocuous reaction products.

16. In a method as defined in claim 14, adding a chemical to the liquid in the conditioning tank of the class consisting of sodium and calcium hyphochlorites, chlorine gas, hydrogen peroxide and permangantes, and chemically reacting the cyanide content of the liquid with the added chemical and forming innocuous products from the cyanide content.

17. In a method as defined in claim 14, flowing conditioned liquid from the reservoir along a catch basin on the floor as a stream and into a sump having liquid-collecting capacity at least sufficient to accommodate an initial spillage from an individual chemical solution-carrying tank, and thereafter flowing the liquid from the sump into the conditioning tank.

18. In a method as defined in claim 17, continuously checking the pH of the liquid within the sump, and introducing an alkaline chemical thereto when the liquid approaches a neutral to an acid pH and thereby preventing the formation of toxic cyanide gas by acid reaction.

References Cited

UNITED STATES PATENTS

| | | | |
|---|---|---|---|
| 3,681,210 | 8/1972 | Zievers et al. | 210—37 X |
| 3,682,701 | 8/1972 | Lancy | 210—60 X |
| 2,725,314 | 11/1955 | Lancy | 134—13 |
| 3,562,016 | 2/1971 | Lancy | 210—60 X |
| 3,607,482 | 9/1971 | Selm | 134—41 X |
| 3,617,582 | 11/1971 | Lawes et al. | 210—63 |

REUBEN FRIEDMAN, Primary Examiner

T. G. WYSE, Assistant Examiner

U.S. Cl. X.R.

134—13, 41